No. 871,565. PATENTED NOV. 19, 1907.
E. B. CAHOON.
TRENCHING HOE.
APPLICATION FILED AUG. 15, 1907.
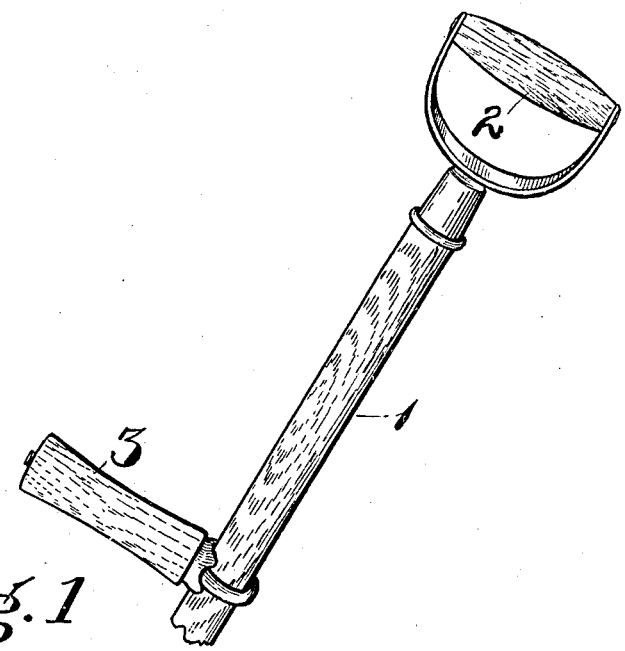
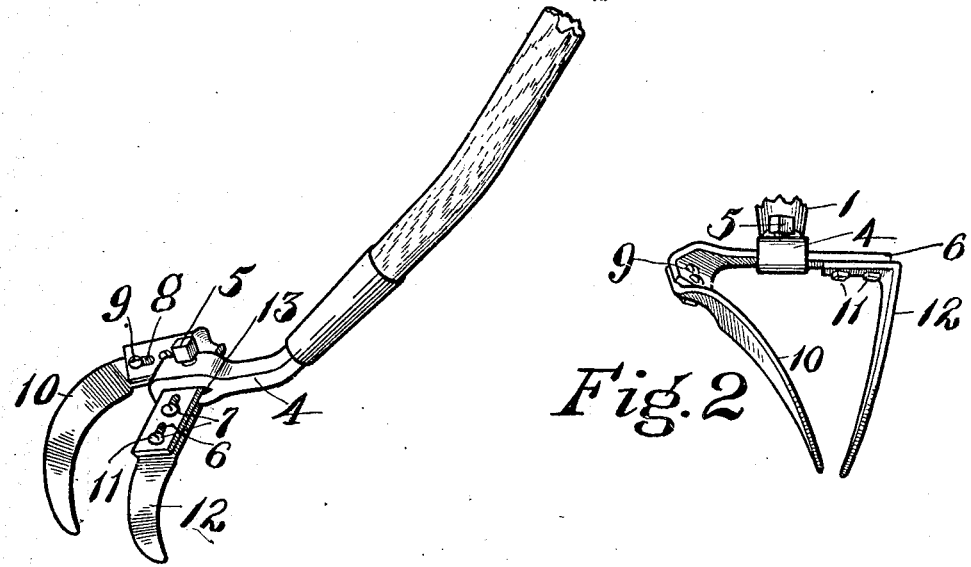
Witnesses:
A. E. Kling
Glenara Fox
INVENTOR—
Everett B. Cahoon
BY C. E. Humphrey.
ATTORNEY.

UNITED STATES PATENT OFFICE.

EVERETT B. CAHOON, OF AKRON, OHIO.

TRENCHING-HOE.

No. 871,565.

Specification of Letters Patent.

Patented Nov. 19, 1907.

Application filed August 15, 1907. Serial No. 388,657.

*To all whom it may concern:*

Be it known that I, EVERETT B. CAHOON, a citizen of the United States, residing at Akron, in the county of Summit and State of Ohio, have invented new and useful Improvements in Trenching-Hoes, of which the following is a specification.

This invention relates to implements for cutting trenches in the sod or earth along the edges of sidewalks, curbstone and other similar places, and the object thereof is to provide a device for this purpose which is of simple construction, easily manipulated and which will effectually cut the sod or earth in such a manner that the cut portions may be easily removed by hand or a suitable tool.

A further object is to provide the device with cutting members which are laterally shiftable with respect to each other and with respect to the handle on which they are mounted.

A further object is to make the cutting blades removable for the purpose of sharpening the same whenever they become dull from use.

Other advantages constituting objects of this invention will more fully appear in the subjoined description.

A practical embodiment of this invention is illustrated in the accompanying drawings, in which similar reference numerals indicate like parts in the different figures.

In the drawings, Figure 1 is a perspective side view of my improved device; and, Fig. 2 is a front elevation showing the cutting blades and lower portion of the supporting handle by which they are supported.

In the drawings, the reference numeral 1 designates a manipulating handle preferably provided at its outer end with the usual shovel handle 2 to afford a firm grasp for the hand of the user. At a suitable point on the handle 1 is a laterally-extending longitudinally-shiftable hand grasp 3 constituting means by which the user may guide the tool in its work and assist in forcing the blades into the earth along the edges of a sidewalk or curbstone.

Fixedly mounted in one end of the handle 1 is a projecting member 4 preferably bent at an angle with the handle 1 and having a transversely-arranged slot 13 in the free end thereof and further provided with a threaded opening extending to said slot to receive a set screw 5 adapted to engage a member mounted in said slot. Mounted in said slot is a laterally-extending cross-bar 6 provided near one end with slotted openings 7 for a purpose to be later described and having its opposite end bent at a right angle to the main portion of said bar which passes through said slot 13. The bent end of this bar 6 is also provided with a plurality of slotted openings 8, 8 through which extend holdfast devices 9. Secured to the bent end of said bar is a curved rearwardly-extending cutting blade 10 by means of said holdfast devices 9. Carried by the opposite end of said bar 6 is a downwardly and slightly inwardly-inclined cutting blade 12 detachably secured to said bar by means of holdfast devices 11. The two blades 10 and 12 are preferably formed in a crescent shape with their inner edges sharpened.

In using this device the handles 2 and 3 are grasped by the operator and the blade 12 which is only slightly inwardly-inclined drawn along the edge of a sidewalk or curbstone and simultaneously forced downwardly into the earth to a depth equivalent to the depth of the trench which is desired made along the sidewalk or curbstone; and at the same time that the blade 12 is making a substantially perpendicular cut into the earth or sod adjacent the curbstone or sidewalk, the blade 10 will cut the earth or sod at an angle with the blade 12, in view of the fact that the point of the blade 10 follows the point of the blade 12. The points of the two blades 10 and 12 may be slightly out of longitudinal alinement with each other, but the distance between the inner edges of the cuts made by the two is so slight that no trouble will be experienced in removing the earth or sod cut loose by these two blades.

The result of the cuts made by the blades 10 and 12 is a deep V-shaped trench along the edge of the sidewalk or curbstone, and the earth or sod cut loose by them is easily removed either by hand or a suitable tool.

In order to perfectly balance the tool in the hands of different operators the cross-bar 6 is made laterally-shiftable in the slotted opening 13 in the member 4 and when in a desired position is securely maintained there by means of the screw 5 which engages the bar 6.

By securing the blades 10 and 12 to the cross-bar 6 by means of holdfast devices secured in slotted openings in the bar, the blades may be readily removed for the purpose of sharpening whenever they become dull and they may also be differently positioned with respect to the bar 6 and to each other, thereby making the cutting portions of the tool adjustable within reasonable limits.

It will be seen from the foregoing that by using this device a perfectly even V-shaped trench may be dug along the edge of the sidewalk or curbstone with great rapidity and with an accuracy not obtained by tools heretofore employed.

This tool is peculiarly well adapted for cutting trenches around flower-beds, especially where they are constructed with curvilinear edges and where the radii of the curves are small and the use of the tool necessitates frequent changes of position, which is not practical where other tools of this type are employed. This device can also be used along the face of a wall or on a side hill with the same facility that the ordinary hoe or garden rake can be used, thereby greatly increasing the opportunities for the use of this device and making it a much more universally applicable trenching device than those heretofore employed for this purpose.

What I claim and desire to secure by Letters Patent, is:—

1. A device of the character described comprising a handle, a member fixedly secured in the end thereof having a transverse slot through the free end thereof and further provided with a threaded opening extending to said slot through which may be passed a holdfast device, a cross-bar mounted in said slot provided with a plurality of openings at each end thereof, a downwardly slightly crescent-shaped cutting blade detachably secured to one end of said cross-bar by holdfast devices passed through a portion of said openings, and an inwardly-inclined rearwardly-curved crescent-shaped cutting blade detachably secured to the opposite end of said cross-bar.

2. A device of the character described comprising a handle, a member fixedly secured in the end of said handle having a transverse slot and further provided with means for frictionally engaging a member positioned in said slot, a cross-bar mounted in said slot having one end thereof bent and provided with a plurality of slotted openings at each end thereof, a downwardly-extending cutting blade mounted on each end of said bar and detachably secured thereto by means of holdfast devices.

3. A device of the character described comprising a handle, a member fixedly secured in the end thereof having a transversely-arranged slot near the free end thereof, means carried by said member for fixedly securing a cross-bar carried by said member, a cross-bar shiftably mounted in said slot provided with a plurality of openings adjacent each end thereof, a cutting blade secured to each end of said cross-bar, and holdfast devices extending through the openings in the ends of said bar for detachably securing said blades to said bar.

In testimony whereof I have hereunto set my hand in presence of two subscribing witnesses.

EVERETT B. CAHOON.

Witnesses:
  GLENARA FOX,
  C. E. HUMPHREY.